United States Patent [19]

Zeigler

[11] 4,355,061
[45] Oct. 19, 1982

[54] COMPOSITE TUBULAR ROD AND METHOD FOR MAKING SAME

[75] Inventor: Myron C. Zeigler, Columbia, S.C.

[73] Assignee: Shakespeare Company, Columbia, S.C.

[21] Appl. No.: 292,494

[22] Filed: Aug. 13, 1981

[51] Int. Cl.³ .................. A01K 87/00; A01K 91/00; B32B 9/00

[52] U.S. Cl. .................................... 428/36; 43/44.98; 156/173; 156/184; 156/189; 156/192

[58] Field of Search .................. 428/35, 36, 57, 58, 428/60, 77, 78, 80, 377, 376, 398; 156/173, 172, 166, 169, 171, 184, 189, 191, 192, 195; 43/44.98

[56] References Cited

U.S. PATENT DOCUMENTS

| | | | |
|---|---|---|---|
| 3,956,564 | 5/1976 | Hillig | 428/366 |
| 4,023,801 | 5/1977 | Van Auken | 428/36 X |
| 4,043,074 | 8/1977 | Airhart | 428/367 |
| 4,061,806 | 12/1977 | Lindler et al. | 428/377 X |
| 4,097,626 | 6/1978 | Tennent | 428/376 |
| 4,133,708 | 1/1979 | Tokuno | 156/189 X |
| 4,135,035 | 1/1979 | Branen | 428/367 X |
| 4,157,181 | 6/1979 | Cecka | 428/377 |
| 4,178,713 | 12/1979 | Higuchi et al. | 428/36 X |

Primary Examiner—Lorraine T. Kendell
Attorney, Agent, or Firm—Hamilton, Renner & Kenner

[57] ABSTRACT

The present invention is directed to a hollow, flexible rod (20) having a body portion (21), a tip portion (23) and a transition portion (24) between the body and tip portions. A plurality of reinforcing strands (30) of a first material extend longitudinally within the body portion (21) and into the transition portion (24). A plurality of reinforcing strands (31) of a second material extend within the tip portion (23) and into the transition portion (24). The reinforcing strands of the first and second materials overlap one or more integer multiples (N) along the circumference of the rod. The present invention is also directed to the method whereby independent prepreg sheets (26,28) formed of the first and second reinforcing strands (31,30) are cut to a tapered apex (33 or 34) and overlapped to a predetermined, interrelated extent longitudinally (T) and laterally (S). So overlapped, the prepreg sheets (26,28) are simultaneously wound onto a mandrel (29) and cured to produce the aforesaid rod (20).

12 Claims, 6 Drawing Figures

COMPOSITE TUBULAR ROD AND METHOD FOR MAKING SAME

TECHNICAL FIELD

The present invention relates to flexible, hollow rods. More particularly, the present invention relates to flexible, hollow rods comprising a plurality of reinforcing filaments bonded together by a suitable, flexible, plastic resin. Specifically, the present invention relates to hollow rods having a body portion with preselected bending characteristics and a tip portion with preselected, and distinctly different, bending characteristics—the said body and tip portions being uniquely interconnected through a transition portion located medially of the body and tip portions.

BACKGROUND ART

Although flexible, high strength, lightweight, tubular rods are desirable for a wide variety of usages, such structural configurations are particularly suited for fishing rods.

Over the past three decades numerous materials and designs have been employed in the construction of fishing rods, but the use of reinforcing filaments embedded in a hard, but flexible, resin have been particularly satisfactory.

Initially, such rods were fabricated with fiberglass strands embedded in resin. One of the pioneer patents in this area—U.S. Pat. No. 2,571,717—taught the use of longitudinally oriented, resin coated, fiberglass strands laid over a mandrel and wrapped with a cellophane tape until the resin cured. Another approach—as disclosed by U.S. Pat. No. 2,726,185—was to wrap a resin impregnated fabric comprised of fiberglass reinforcing strands onto a mandrel and allow the resin to harden with the fabric so wrapped upon the mandrel. Both of these prior art patents emphasized the longitudinal orientation of the fiberglass strands to impart the necessary flexural strength to the finished rod.

U.S. Pat. No. 2,749,643 contributed a further advance to the art by teaching that the reinforcement achieved by the longitudinally oriented fibers would be augmented by the use of a short pitch helical wrap of fiberglass strands to impart hoop strength to the arrangement. The aforesaid prior art, however, taught that all reinforcing strands in any one rod would be of a common material.

Eventually rods were made which constituted a composite of more than one type of reinforcing strand. U.S. Pat. No. 4,061,806 exemplifies the use of an intermix of glass fibers and graphite fibers to provide a very lightweight, high strength construction.

Even over and above lightness of weight and high strength, the "action" is perhaps one of the most significant characteristics of a fishing rod.

A typical hollow fishing rod made only of glass strands encapsulated in a suitable resin normally would have a modulus of elasticity on the order of $5 \times 10^6$ psi. A comparable rod made only of graphite encapsulated in a suitable resin would have a modulus of elasticity on the order of $12 \times 10^6$ psi. Hence, the graphite rod would be stiffer than its fiberglass counterpart. Although each fisherman is somewhat of an individualist, a great number appreciate the stiffer response through the body portion of the rod but prefer a more flexible tip portion.

Some initial experiments were made in employing materials of different moduli in the body and tip portions, but those attempts effected joinder between the different sections of the rod by such means as ferrules or adhesive butt-joints. Such joinder techniques effect a sharp demarcation between portions of the rod having different flexural characteristics.

When such a rod is bowed, as when playing a fish, the different flexural characteristics on either side of the joinder impart an appearance that the rod has some inherent structural flaw which is about to permit the rod to break under load. This would be aesthetically unacceptable even if the rod were functionally unimpared.

However, such a joinder is marked by a localized increase in the diameter of the rod which not only detracts from the aesthetic appearance thereof but also functionally affects stress concentrations across the joinder that are highly deleterious to the integrity of the rod.

DISCLOSURE OF THE INVENTION

It is, therefore, a primary object of the present invention to provide a rod having a tip portion that is relatively more flexible than the body portion.

It is another object of the present invention to provide a rod, as above, wherein the joinder of the tip portion to the body portion is accomplished with a smooth joinder which is devoid of bumps, ridges or ferrules and which is not, therefore, readily detectable by sight or touch either when the rod is at rest or in use.

It is a further object of the present invention to provide a rod, as above, wherein the tip portion is reinforced by fiber strands such that the composite modulus of elasticity for said tip portion is less than the composite modulus of elasticity for the body portion, which is also reinforced by fiber strands.

It is an additional object of the present invention to provide a rod, as above, which is fabricated with the fiber reinforcing strands of the body portion overlapping those of the tip portion within a transition portion located medially of the body and tip portions.

It is a still further object of the present invention to provide a rod, as above, wherein the overlap of the reinforcing strands within the transition portion extends one or more integer multiples along the circumference of the transition portion of said rod.

It is yet another object of the present invention to provide a rod, as above, that is particularly suited to be a fishing rod.

It is an even further object of the present invention to provide a method for manufacturing a rod, as above.

It is a still further object of the present invention to provide a method, as above, in which the reinforcing strands of the body and tip portions are incorporated in separate, flexible prepreg sheets that are cut to tapered apices, longitudinally overlapped to a predetermined extent and simultaneously wound onto a mandrel to effect the desired circumferential overlap in the completed rod.

These and other objects, together with the advantages thereof over existing and prior art forms which will become apparent from the following specification, are accomplished by means hereinafter described and claimed.

In general, a method for making rods in accordance with the concept of the present invention comprises the steps of forming prepreg sheets from reinforcing strands having the desired physical and structural properties.

The prepreg sheet used to form the body portion of the rod will employ one type of reinforcing material, and the prepreg used to form the tip portion will employ another type of reinforcing material.

With the prepreg sheets for the body and tip portions being appropriately selected they will be cut in a generally understood manner to be wrapped onto a mandrel, but in addition, the two prepregs will be cut uniquely to present tapered apices that can be longitudinally overlapped to a predetermined extent and then simultaneously wound onto a mandrel. Thereafter, the resin in the prepregs will be suitably hardened, and the mandrel preferably removed, to complete the rod.

The resulting rod, which is particularly suitable for fishing, will have a body portion, a tip portion and a transition portion between the body and tip portions. A plurality of reinforcing strands fabricated from a first material extend longitudinally within the body portion and into the transition portion. Similarly, a plurality of reinforcing strands fabricated from a second material extend longitudinally within the tip portion and into the transition portion. The length of the various strands are such that those from the body and tip portions circumferentially interlaminate within the transition portion only as an integer multiple of the circumferential dimension of the rod at the transition portion.

One preferred embodiment of a rod incorporating the objects of the present invention is shown by way of example in the accompanying drawings and described in detail, together with a method by which said rod may be fabricated, without attempting to show all of the various forms and modifications in which the invention might be embodied; the invention being measured by the appended claims and not by the details of the specification.

DESCRIPTION OF A PREFERRED EMBODIMENT

As heretofore explained, the wrapping of a prepreg sheet onto a mandrel, and then hardening the resin to form a rod, is well known to the art.

Although the prior art adequately defines a "prepreg" sheet, a complete understanding of the present invention may be enhanced by knowing that a prepreg sheet constitutes a cloth formed from the desired reinforcing fibers. The reinforcing fibers are coated with a suitable resin that is latentably hardenable but which remains flexible until it is intentionally hardened. The resin binds the adjacent fibers together into a sheet which, like cloth, has sufficient integrity that the adjacent fibers are not easily separated and yet affords adequate flexibility for the sheet to be readily workable, as required to wind the sheet onto a mandrel in accordance with the explanation which follows. In a sense, then, the sheet has been preimpregnated with resin—hence, the designation "prepreg" sheet.

Figure 1:
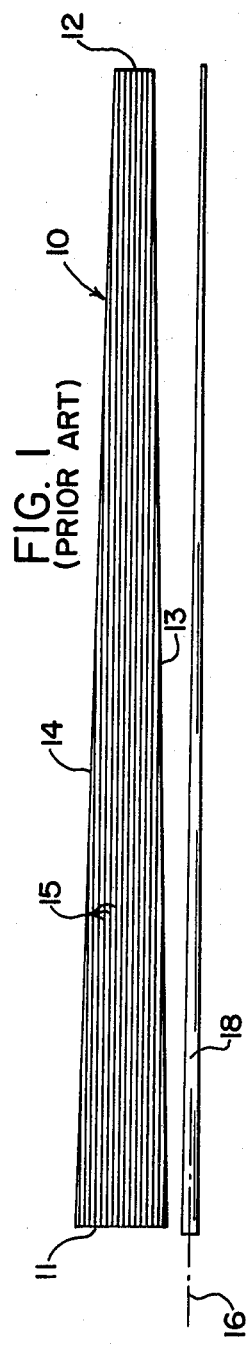
FIG. 1 is a schematic top plan view depicting a prepreg sheet cut to be wound onto a mandrel for forming a flexible, tubular rod in accordance with a concept of the prior art, said Figure being so labeled.

Historically, when making a tapered rod the prepreg is cut as truncated isosceles triangle or, as shown, a right angled trapezoid—Item 10 in FIG. 1—with two parallel sides 11 and 12 and two nonparallel sides 13 and 14. The reinforcing filaments 15 are normally oriented parallel to side 13, and side 13 is aligned with the longitudinal axis 16 of the tapered mandrel 18. The mandrel is then rotated to wind the prepreg thereabout. The lengths of the two parallel sides 11 and 12 are determined by the circumference of the mandrel at the location therealong at which the sides are to be wrapped, and the number of times the prepreg shall be wrapped about the mandrel. This concept is well known to the prior art.

The present invention expands upon the knowledge imparted by the prior art in a most novel and unique manner. Specifically, the knowledge imparted by the prior art teaches one how to determine the metes and bounds of the perimeter to which the prepreg must conform in order to achieve the desired wrap of the prepreg with respect to the body and tip portions per se. Hence, the prior art teaches that the dimensions of the parallel sides 11 and 12 of the prepreg sheet depicted in FIG. 1 must be of sufficient magnitude overlappingly to embrace the circumference of the mandrel 18 at the location therealong about which the parallel sides would be wrapped.

Figure 4:
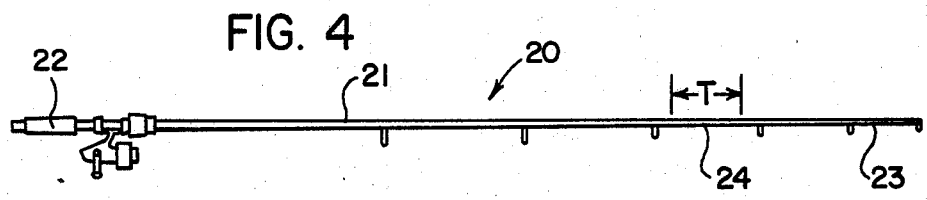
FIG. 4 is a schematic, side elevation of a fishing rod, the rod portion of which embodies the concept of the present invention.
Figure 5:
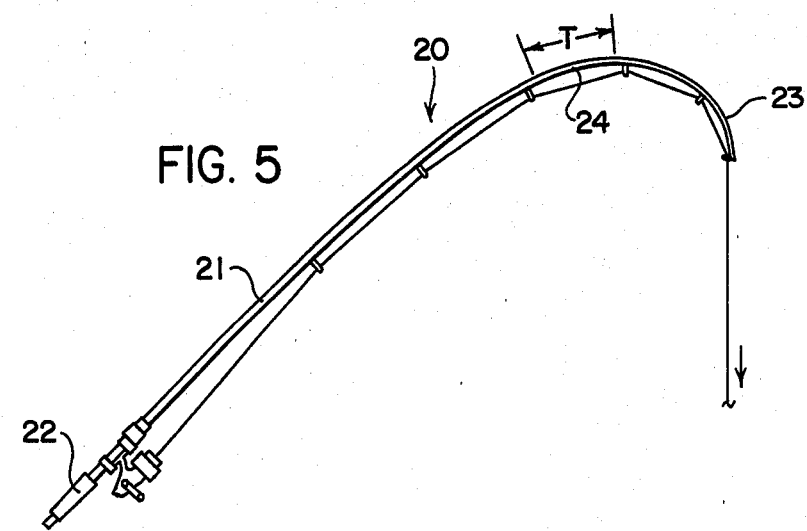
FIG. 5 is a side elevation of the fishing rod depicted in FIG. 4 schematically representing the desired flexural differences between the body, transition and tip portions thereof; and, FIG. 6 is a schematic, top plan similar to a portion of FIG. 2 but disclosing the prepreg sheets cut to different apex angles.

A rod 20 (as best seen in FIGS. 4 and 5) embodying the concept of the present invention and employed as a fishing rod has a body portion 21 to one end of which the handle 22 is secured. A tip portion 23 is presented at the end of the rod distal with respect to the handle 22. Medially of the body and the tip portions 20 and 23, respectively, is a transition portion 24.

As schematically depicted in FIG. 5, when the fishing rod 20 is in use it is generally desired that the body portion 21 will have more spine—i.e., the body portion will be relatively stiffer than the remainder of the rod—and the tip portion 23 will have considerably greater flexibility. The relative stiffness of the body and tip portions of a fishing rod is, in the composite, designated as the "action" of the rod.

The action of the fishing rod is just as important in casting the lure as it is to the response of the rod when the fisherman sets the hook or subsequently plays the hooked fish. Rod makers fully recognize the importance not only of the relative spine, or stiffness, of the body and tip portions, but each rod maker also has his own preference as to the relative length of the body and tip portions. The present invention is not intended to encroach upon the parameters the various rod makers have individually established for the relative spine, or the relative lengths, of the body and tip portions. Rather, the present invention is directed to the means by which the body and tip portions can be joined together to assure that flexure consistent with the desired action will be provided across the joinder irrespective of the circumferential location on the rod along which one might choose to mount the line guides. In addition, the present invention affords a smooth transition between the body and tip portions—the length of the transition being capable of preselection, within a reasonable range, by the rod designer to accommodate his personal idiosyncrasies.

Figure 2:
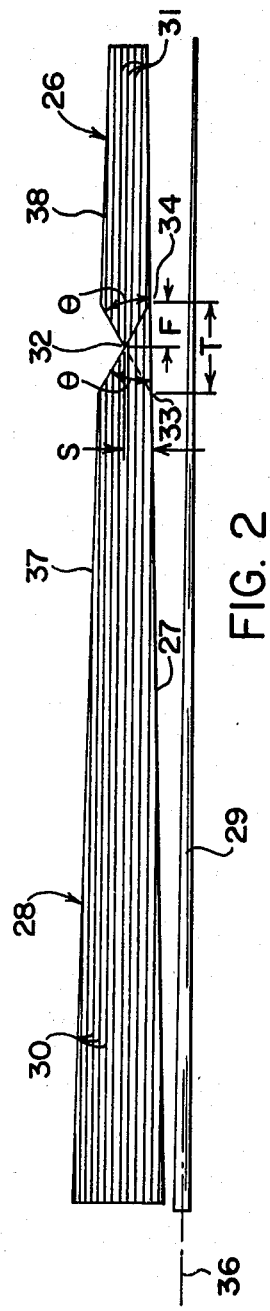
FIG. 2 is a view similar to FIG. 1 but depicting the unique configuration and disposition of two prepreg sheets to provide a composite, tubular rod having portions corresponding to the locations of the two prepregs, said portions being of distinctly different flexural characteristics in accordance with the concept of the present invention.
Figure 3:
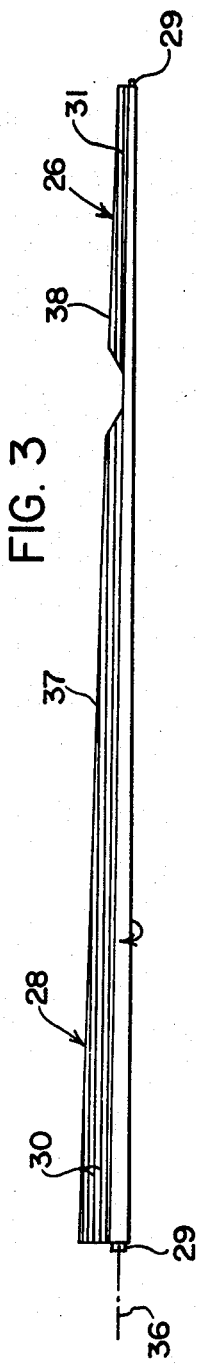
FIG. 3 is a schematic top plan similar to FIG. 2 but depicting the two prepreg sheets having been partially wound onto a mandrel.

The rod 20 can, according to the concept of the present invention and as best seen in FIGS. 2 and 3, be formed from two prepreg sheets 26 and 28 that are overlapped, as hereinafter more fully explained, and wrapped about a mandrel 29.

The prepreg sheet 26 will form the tip portion 23 of the finished rod 20, and as such comprises a fabric made from a reinforcing strands 31 selected such that the composite modulus of elasticity for the tip portion 23 will provide the degree of flexibility desired by the rod designer for that portion of the rod 20.

Any number of materials may be selected to reinforce the tip portion 23, but fibers of glass or Kevlar would be quite suitable. Fiberglass reinforced sections may readily be fabricated to provide a composite modulus of elasticity in the range of from approximately $4 \times 10^6$ psi to approximately $7 \times 10^6$ psi. Kevlar reinforced sections can similarly be fabricated to provide a composite modulus from about $8 \times 10^6$ to approximately $11 \times 10^6$ psi.

Similarly, the prepreg sheet 28 will form the body portion 21 of the finished rod 20, and as such comprises a fabric made from a reinforcing material selected such that the composite modulus of elasticity for the body portion will provide the stiffness desired by the rod designer for the body portion.

Here, too, any number of materials may be selected for use as the reinforcing strands 30. When the rod is to be fabricated so that the body portion 21 is stiffer than the tip portion 23, as is generally preferred for fishing rods, one might consider using graphite fibers for the reinforcing material. It is well within the capability of one skilled in the art to fabricate a graphite reinforced body portion having a composite modulus of elasticity in the range of from approximately $12 \times 10^6$ psi to approximately $25 \times 10^6$ psi. One might also employ boron fibers, which permit a rage of approximately $20 \times 10^6$ to $35 \times 10^6$ psi for the composite modulus of elasticity for such a structural section.

The foregoing examples are, of course, merely exemplary. As time goes by, more and more sophisticated materials may become available, and they, too, could well be employed within the concept of the present invention. Those skilled in the art may also employ more than one type of reinforcing fiber within each portion of the rod, as required to achieve the desired modulus for a given size of rod section. In fact, for some applications it may well be desirable to have the tip portion stiffer than the body portion, or perhaps have a tip portion on either end of the body portion. Once the basic concept of the present invention is understood, many variations are well within the realm of possibility.

Continuing with the exemplary disclosure of the present invention as it relates to the manufacture of a fishing rod having the design parameter that the tip portion be relatively more flexible than the body portion, it has been noted that for such purpose the composite modulus of the tip portion 23 should be at least $2 \times 10^6$ psi less than the composite modulus for the body portion 21.

The rod designer will next determine the longitudinal dimension "T" he desires for the transition portion of the particular rod 20, and with that information he can calculate the apex angle $\theta$ to which the apices 33 and 34 of the two prepreg sheets 26 and 28, respectively, are to be cut by the following formula:

$$\text{arc contangent } \theta = T/\pi ND$$

wherein

T = the longitudinal dimension of the transition portion 24
N = an integer (preferably an even integer)
D = the diameter of the mandrel at the location along the mandrel about which the sheets are to wrap the even integer number of times designated by N In practice it has been found that $\theta$ should preferably fall within the range of from about 40° to approximately 75°. Larger angles tend to make the transition portion 24 too short to be most effective, and smaller angles similarly tend to make the transition portion too long.

It should also be understood that N is selected to be an even integer so that the overlap of the prepreg sheets will span the circumference of the mandrel a predetermined number of times. In essence, it is essential that the overlapped portions of the sheets wrap around the mandrel an exact number of turns. Thus, the span "S" from the coincident edge 27 of the overlapped sheets 26 and 28 to the crossover point 32 must be such that as the overlapped portions have been wrapped about the mandrel 29 the crossover point 32 will be radially superposed with respect to the coincident edge 27. This distance "S" must, therefore, constitute an integer multiple "n" of the circumference of the mandrel 29.

Balanced bending strength in the rod is further assured by having the crossover point 32 lie halfway between the coincident edge 27 and the preferably aligned edges 37 and 38 of the prepreg sheets 26 and 28, respectively. Thus, when the prepreg sheets have been fully wrapped onto the mandrel the edges 37 and 38 will also be radially superposed with respect to the coincident edge 27. As such, the total number of wraps from edge 27 to edges 37 and 38 must be an even integer "N", irrespective of the integer number "n" of wraps from edge 27 to the crossover point 32. The span, therefore, from edge 27 to edges 37 and 38 must constitute an even integer multiple "N" of the circumference of the mandrel 29. Were the overlapping wraps to constitute a fractional number of turns, the resulting rod would not possess uniform bending strength in all directions.

Were one arbitrarily to select an apex angle $\theta$ and then wish to determine the dimension "F" to which the apex of the prepreg sheet should extend beyond the crossover point 32, for a given number of wraps the following formula would be used to calculate that dimension:

$$F = n\pi D \text{ cotangent } \theta$$

wherein the variables are those hereinbefore identified and explained.

Figure 6:
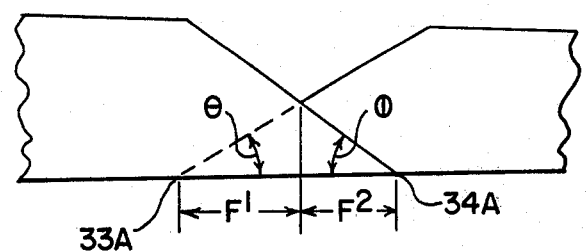

When the apices of the two prepreg sheets are cut to the same angle, the total overlap would be equal to twice the dimension F, but, as depicted in FIG. 6, where the apices 33A and 34A are cut to different angles—$\theta$ and $\Phi$—one would solve for dimension $F^1$ with respect to angle $\theta$ and $F^2$ with respect to angle $\Phi$ and the total overlap would be equal to $F^1$ plus $F^2$.

With the apices of the two prepreg sheets cut according to the desired angle, and with the apices overlapped as depicted in FIG. 2, they would then be simultaneously wound onto the mandrel 29 and the resin cured to its final stage. So wound onto the mandrel the sheets 26 and 28 forming the tip and body portions are disposed in cylindrical coils with the reinforcing strands in each coil extending substantially longitudinally of the coils—i.e., substantially parallel to the longitudinal axis 36 of the mandrel 29 onto which the prepreg sheets are wound. By having been overlappingly disposed, as the prepreg sheets are wound onto the mandrel the coil forming the body portion 21 will be disposed interlaminate the coil forming the tip portion 23 within the transition portion 24.

The resins to be used with the prepregs should be selected to be each compatible with the other and each to be compatible with the reinforcing strands in both prepregs. The making of the prepregs, the general type resins to be employed and the hardening stages desired for the resins are well known to the art and are fully explained in U.S. Pat. No. 2,726,185 to which reference is specifically made.

In view of the foregoing disclosure it should be apparent to one skilled in the art that the subject invention discloses a novel and unique construction, as well as a method, by which to conjoin body and tip portions of differing moduli into a unitary fishing rod and otherwise accomplish the objects of the invention.

I claim:

1. A method for forming a hollow rod having a body portion and a relatively more flexible tip portion with a transition portion longitudinally therebetween and in which said body and tip portions are reinforced with distinctly different filaments that are overlappingly anchored within said transition portion comprising the steps of: providing a first flexible prepreg sheet incorporating a plurality of first reinforcing strands coated, and bonded together, with a flexible latently hardenable resin; providing a second flexible sheet incorporating a plurality of selected second reinforcing strands coated, and bonded together, with a flexible, latently hardenable resin compatible with the resin in said first prepreg sheet; cutting each said sheet to a tapered apex; longitudinally overlaping said tapered apices; simultaneously wrapping said sheets upon a mandrel; and, hardening the resin in said sheets.

2. A method, as set forth in claim 1, in which the step of overlapping the tapered apices provides a transversed dimension at the maximum overlap of said tapered apices equal to an integer multiple of the circumferencial dimension of the mandrel at the location about which the maximum overlap of the sheets shall be wrapped upon said mandrel.

3. A method, as set forth in claim 2, in which the step of cutting the tapered apices provides an apex angle on the tapered sheet falling within the range of from about 40° to approximately 75°.

4. A method, as set forth in claim 1, in which the step of overlapping provides a transverse overlap, the longitudinal dimension of said overlap being equal to $$N\pi D \text{ contagent } \theta$$

wherein N equals an integer, D equals the diameter of the mandrel at the location about which the maximum lateral overlap of the prepregs is to be wrapped and $\theta$ equals the internal angle at the tapered apex.

5. A method, as set forth in claim 4, wherein the angle $\theta$ falls within the range of from about 40° to approximately 75°.

6. A method, as set forth in claim 5, wherein the reinforcing strands in the first prepreg sheet provide a composite modulus of elasticity for the body portion that is at least $2 \times 10^6$ psi higher than the composite modulus provided to the tip portion by reinforcing strands in the second prepreg.

7. A method, as set forth in claim 6, in which the majority of the reinforcing strands in said first and second prepreg sheets are oriented parallel to each other and the sheets are wound onto the mandrel such that the reinforcing strands therein are oriented substantially parallel to the longitudinal axis of the mandrel.

8. A hollow, flexible rod comprising: a body portion; a relatively more flexible tip portion; a transition portion between said body and tip portions; a plurality of reinforcing strands fabricated from a first material extending longitudinally within said body portion and into said transition portion; a plurality of reinforcing strands fabricated from a second material extending longitudinally within said tip portion and into said transition portion; and, said reinforcing strands being bonded together with a flexible, plastic resin.

9. A rod, as set forth in claim 8, on which the reinforcing strands from the body portion overlap the reinforcing strands from the tip portion within the transition portion, said overlap extending one or more integer multiples along the circumference of said rod.

10. A rod, as set forth in claim 8, in which the reinforcing strands are encapsulated in sheets, the sheets forming said body portion and said tip portion being disposed in cylindrical coils with the reinforcing strands in each coil extending substantially longitudinally of said coil, said coil forming the body portion being interlaminate the coil forming the tip portion within said transition portion.

11. A rod, as set forth in claim 10, in which the circumferential interlamination within the transition portion occurs only as an integer multiple of the circumferential dimension of the rod at the transition portion.

12. A hollow, flexible rod as in claim 8, wherein the composite modulus of elasticity for said body portion is at least $2 \times 10^6$ psi higher than the composite modulus for said tip portion.

* * * * *